(12) United States Patent
Yamashita et al.

(10) Patent No.: US 10,578,200 B2
(45) Date of Patent: Mar. 3, 2020

(54) GEAR PAIR

(71) Applicants: NISSAN MOTOR CO., LTD., Yokohama-shi, Kanagawa (JP); AICHI MACHINE INDUSTRY CO., LTD., Nagoya-shi, Aichi (JP)

(72) Inventors: Takemichi Yamashita, Kanagawa (JP); Yutaka Mabuchi, Kanagawa (JP); Takeshi Kariya, Kanagawa (JP); Takao Mori, Kanagawa (JP); Tadashi Goto, Nagoya (JP); Hiroyasu Nagami, Kasugai (JP)

(73) Assignees: NISSAN MOTOR CO., LTD., Yokhama-shi (JP); AICHI MACHINE INDUSTRY CO., LTD., Nagoya-shi (JP)

( * ) Notice: Subject to any disclaimer, the term of this patent is extended or adjusted under 35 U.S.C. 154(b) by 409 days.

(21) Appl. No.: 15/504,394

(22) PCT Filed: Jun. 12, 2015

(86) PCT No.: PCT/JP2015/066996
§ 371 (c)(1),
(2) Date: Feb. 16, 2017

(87) PCT Pub. No.: WO2016/031347
PCT Pub. Date: Mar. 3, 2016

(65) Prior Publication Data
US 2017/0234417 A1     Aug. 17, 2017

(30) Foreign Application Priority Data
Aug. 28, 2014   (JP) .................................. 2014-174014

(51) Int. Cl.
*F16H 55/17*     (2006.01)
*F16H 1/08*      (2006.01)
*F16H 55/06*     (2006.01)

(52) U.S. Cl.
CPC ............... *F16H 55/17* (2013.01); *F16H 1/08* (2013.01); *F16H 55/06* (2013.01)

(58) Field of Classification Search
CPC ............. F16H 55/17; F16H 55/06; F16H 1/08
See application file for complete search history.

(56) References Cited

U.S. PATENT DOCUMENTS

| | | | | |
|---|---|---|---|---|
| 8,096,205 B2 * | 1/2012 | Okamoto | ............ | C23C 14/0605 184/6.12 |
| 2005/0025975 A1 | 2/2005 | Okamoto et al. | | |
| 2008/0076684 A1 | 3/2008 | Nabu et al. | | |
| 2008/0276755 A1 * | 11/2008 | Okamoto | ............ | C23C 14/0605 74/640 |

FOREIGN PATENT DOCUMENTS

| | | | |
|---|---|---|---|
| JP | 07-293668 | A | 11/1995 |
| JP | 2004-308817 | A | 11/2004 |
| JP | 2005-061610 | A | 3/2005 |
| JP | 2008-074947 | A | 4/2008 |
| JP | 2014-137082 | A | 7/2014 |

* cited by examiner

*Primary Examiner* — Victor L MacArthur
(74) *Attorney, Agent, or Firm* — Foley & Lardner LLP

(57) ABSTRACT

A gear pair includes a first gear and a second gear that are engaged and paired with each other, wherein the arithmetic average roughness Ra of the tooth surface of the first gear is less than 0.10, and the arithmetic average roughness Ra of the tooth surface of the second gear is equal to or greater than 0.15. An improvement of the transmission efficiency is achieved due to the improved composite roughness of the gear pair. Accordingly, both of the improvement of the transmission efficiency of the gears and an improvement of the pitting fatigue life are achieved at low cost.

15 Claims, No Drawings

GEAR PAIR

TECHNICAL FIELD

The present invention relates to a gear pair that includes a first gear and a second gear engaged and paired with each other.

BACKGROUND ART

One of gear pairs known in the art is described, for example, in Patent Document 1. The gear pair described in Patent Document 1 includes a first gear and a second gear that are engaged and paired with each other, in which the arithmetic average roughness Ra, the maximum height Ry, the skewness Rsk and the ratio Ry/Ra of arithmetic average roughness and maximum height of the tooth surfaces of the respective gears are specified. This configuration increases the amount of oil held between the tooth surfaces to reduce the coefficient of friction between the tooth surfaces, so as to improve the seizure resistance and the abrasion resistance of the tooth surfaces and also to improve the power transmission efficiency of the gears.

CITATION LIST

Patent Literature

Patent Document 1: JP 2004-308817A

SUMMARY OF INVENTION

Technical Problem

The improvement of the transmission performance in such conventional gear pairs is achieved by specifying the surface roughness of the tooth surfaces of the gears. However, when the surface roughness of the tooth surfaces is different between the gears, the pitting fatigue life is greatly affected by inevitable misaligned contact between tooth faces or tooth flanks. Since improvement of the transmission performance of the gears and improvement of the pitting fatigue life are trade-off against each other, it has been difficult to achieve both of them.

The present invention has been made in view of the above-described problem with the prior art, and an object thereof is to provide a gear pair in which an improvement of the transmission efficiency is achieved by improving the composite roughness so that both of an improvement in transmission efficiency of the gears and an improvement in pitting fatigue life of the tooth surface can be achieved at low cost.

Solution to Problem

The gear pair of the present invention includes a first gear and a second gear that are engaged and paired with each other, wherein the arithmetic average roughness Ra of the tooth surface of the first gear is less than 0.10 and the arithmetic average roughness Ra of the tooth surface of the second gear is equal to or greater than 0.15, and wherein the number of teeth of the first gear is less than the number of teeth of the second gear.

Advantageous Effects of Invention

With the above-described configuration, an improvement of the transmission efficiency is achieved in the gear pair of the present invention by the improved composite roughness of the pair of gears, so that both of an improvement of the transmission efficiency of the gears and an improvement of the pitting fatigue life of the tooth surfaces are achieved at low cost.

DESCRIPTION OF EMBODIMENT

A gear pair according to the present invention includes a first gear and a second gear that are engaged and paired with each other. The first gear may be constituted by any one of a helical gear, a spur gear and a helical gear. Similarly, the second gear may be constituted by any one of a helical gear, a spur gear and a helical gear.

The gear pair is configured such that the arithmetic average roughness Ra of the tooth surface of the first gear is less than 0.10, and the arithmetic average roughness Ra of the tooth surface of the second gear is equal to or greater than 0.15. In a more preferred embodiment, the gear pair is configured such that the arithmetic average roughness Ra of the tooth surface of the first gear is equal to or less than 0.05, and the arithmetic average roughness Ra of the tooth surface of the second gear is equal to or greater than 0.30.

As described above, the gear pair is configured such that the arithmetic average roughness Ra of the tooth surface of the first gear is small while the arithmetic average roughness Ra of the tooth surface of the second gear is slightly rougher. In gear pairs of this type, the power transmission efficiency is improved as the arithmetic average roughness of the tooth surface is decreased. However, when the arithmetic average roughness of the tooth surface is decreased in both gears, deterioration of the pitting property is observed. To avoid this, in the gear pair, the second gear is formed to have a rougher tooth surface than the first gear so that so-called initial conformation (running-in) can occur. When the arithmetic average roughness Ra of the tooth surface of the first gear is less than 0.10 and the arithmetic average roughness Ra of the tooth surface of the second gear is equal to or greater than 0.15, the pitting resistance can be improved even without coating. As a result, in the gear pair, both of an improvement of the transmission efficiency of the gears and an improvement of the pitting fatigue life of the tooth surface can be achieved at low cost.

The gear pair is configured such that the number of teeth of the first gear is less than the number of teeth of the second gear. That is, when the gear pair rotationally transmits power through the first and second gears, the first gear having fewer teeth is subjected to a larger number of slides on the tooth surface. In the gear pair, the first gear having fewer teeth is configured to have a tooth surface with small arithmetic average roughness Ra so that the second gear has a rougher tooth surface. Accordingly, abrasion due to misaligned contact between the tooth faces or tooth flanks occurs in the first gear that is subjected to a larger number of stress loads, which eventually reduces the pitting fatigue life.

In the gear pair, the surface roughness of the tooth surfaces of the first and second gears is such that both of the first and second gears have an Rsk of a negative value and a ratio of Ry to Ra (Ry/Ra) of 6 or more, where Ra is the arithmetic average roughness, Ry is the maximum height and Rsk is the skewness. The tooth surfaces having an Rsk of a negative value can avoid a localized contact during rotational transmission and also reduce the surface pressure, which reduces an occurrence of pitting.

In the gear pair, the root mean square height Rq1 and Rq2 of the tooth surfaces of the first and second gears is such that the mean square roughness (composite roughness) Rrms of Rq1 and Rq2 combined, which is defined as Rrms=√(Rq1²+Rq2²), is Rrms<0.4.

In a more preferred embodiment, the gear pair is configured such that the surface hardness of the tooth surface of the first gear is less than the surface hardness of the tooth surface of the second gear, in which the difference in surface hardness is made by providing a hard surface treatment on the surface of at least the second gear among the first and second gears.

In the gear pair, the hard surface treatment may be to form a diamond-like carbon coating (hereinafter referred to as a "DLC coating"), more desirably a DLC coating with a hydrogen content of 1 at % or less. Further, in the gear pair, barrel polishing is employed as the polishing method for smoothing the tooth surface of at least one of the first and second gears.

A number of gear pairs with different combinations of roughness were tested, and the damaged tooth surfaces of the gears were observed in detail. As a result, it was found that the pitting fatigue life is greatly affected by misaligned contact between the tooth faces or the tooth flanks that inevitably occurs.

Specifically, it was found that a gear that has a small number of teeth and is subjected to a large number of slides, such as the first gear, exhibits a positive correlation between the amount of abrasion in the tooth surface due to misaligned contact and the pitting fatigue life. That is, as the amount of abrasion increases, the stress concentration in misaligned contact is reduced, which eventually leads to delayed development of cracks that leads to pitting.

Therefore, in the gear pair, when the roughness of the tooth surface is decreased in order to reduce metal contact, it is effective to reduce the surface roughness of the tooth surfaces of both gears. However, in order to reduce misaligned contact between the tooth faces or tooth flanks, it is important to take abrasion due to misaligned contact into consideration to select a combination in which abrasion readily occurs with regard to the surface roughness of the tooth surfaces of the gears.

Based on the above concept, it is essential for the gear pair that the counterpart gear to the gear that is subjected to abrasion due to misaligned contact between the tooth faces or tooth flanks has larger surface roughness or higher surface hardness. Further, in the gear pair, in order to promote abrasion due to misaligned contact between the tooth faces or tooth flanks, it is also effective to provide a heat treatment or a coating to the tooth surface in addition to the hardness of the base material.

In the gear pair, when the tooth surfaces of the first and second gears has approximately the same hardness, the pitting fatigue life, which is accelerated by misaligned contact between the tooth faces or tooth flanks, largely depends on the number of stress loads. Accordingly, it is mainly the number of teeth of the gears which decides the gear suffering from fatigue. That is, the gear having relatively fewer teeth (mainly the first gear) is subjected to a larger number of stress loads. Accordingly, when the gear having fewer teeth is subjected to abrasion due to misaligned contact between the tooth faces or tooth flanks, the pitting fatigue life is eventually improved.

In the gear pair, in order to improve the power transmission efficiency, it is also effective to employ a processing method such as barrel polishing that collaterally polishes tip corners of the teeth to cause roll over in the preferentially polished edges in addition to improving the surface roughness of the tooth surface since such roll over eventually reduces misaligned contact between the tooth faces or tooth flanks.

In the gear pair, with regard to the coating of the tooth surfaces of the gears, it is effective to form a DLC coating in order to reduce the friction at a contact point when metal contact occurs. In particular, a DLC coating that does not contain hydrogen is effective for reducing the friction since it preferentially adsorb oily agents in lubricant physically on the surface so as to prevent metal contact between two surfaces. Further, a DLC coating that does not contain hydrogen typically exhibits higher hardness and is therefore more effective in terms of promoting abrasion due to misaligned contact between the tooth faces or tooth flanks.

A number of gear pairs with different combinations of surface roughness of the tooth surfaces were tested, and the tooth surfaces of damaged gears were observed and analyzed in detail. The results are shown in Table 1 and Table 2. All of the gears of the examples (Table 1) and the comparative examples (Table 2) were helical gears.

TABLE 1

All helical gears

| | | | Example | | | | | |
|---|---|---|---|---|---|---|---|---|
| | | | 1 | 2 | 3 | 4 | 5 | 6 |
| | | | | | Specification | | | |
| | | | Smooth/ Normal | Smooth/ Normal | DLC/ DLC | Smooth/ Normal | Normal/ Smooth | Smooth/ Normal |
| Gear 1 | Number of Teeth | n | 15 | 15 | 15 | 15 | 62 | 15 |
| | Surface Roughness | Ra | 0.036 | 0.032 | 0.032 | 0.080 | 0.076 | 0.030 |
| | | Rq | 0.045 | 0.040 | 0.040 | 0.100 | 0.095 | 0.040 |
| | | Ry | 0.38 | 0.32 | 0.3 | 0.78 | 0.75 | 0.402 |
| | | Rsk | −0.9 | −2.3 | −1.8 | −1 | −0.5 | −0.8 |
| | | Ry/Ra | 10.6 | 10.0 | 9.4 | 9.8 | 9.9 | 13.4 |
| | Surface Hardness | HRC | 58 | 58 | 59 | 58 | 60 | 59 |
| | Finishing | | Barrel Polishing | Barrel Polishing | Barrel Polishing | Barrel Polishing | Barrel Polishing | Barrel Polishing |
| | Surface Treatment | | | | DLC by Arc Ion Plating | | | |
| Gear 2 | Number of Teeth | n | 62 | 62 | 62 | 62 | 15 | 62 |
| | Surface Roughness | Ra | 0.162 | 0.158 | 0.220 | 0.180 | 0.194 | 0.308 |
| | | Rq | 0.203 | 0.198 | 0.275 | 0.225 | 0.243 | 0.385 |

TABLE 1-continued

| | | | | | | | | |
|---|---|---|---|---|---|---|---|---|
| All helical gears | | | | | | | | |
| | | Ry | 1.33 | 1.76 | 2.32 | 2.1 | 1.83 | 2.83 |
| | | Rsk | −0.8 | −0.6 | −0.6 | −1.0 | −0.8 | −1.2 |
| | | Ry/Ra | 8.2 | 11.1 | 10.5 | 11.7 | 9.4 | 9.2 |
| | Surface Hardness | HRC | 58 | 59 | 60 | 61 | 59 | 61 |
| | Finishing | | — | — | — | — | — | — |
| | Surface Treatment | | | | DLC by Arc Ion Plating | | | |
| Gear Pair | Composite Roughness | Rrms | 0.207 | 0.202 | 0.278 | 0.246 | 0.260 | 0.387 |
| Transmission Efficiency | % | | 96.3 | 96.1 | 98.2 | 95.8 | 96 | 96.2 |
| Pitting Fatigue Life | | | 9.17E+06 | 1.85E+07 | 1.10E+07 | 1.02E+07 | 8.92E+06 | 2.21E+07 |
| Tooth Surface Temperature* | ° C. | | 125 | 127 | 124 | 132 | 125 | 133 |

| | | Gear 1: 0.05 or less | Gear 1: 0.05 or less | DLC/DLC | Ra approx. 0.1 | Opposite Number of Teeth | Gear 2: Course |
|---|---|---|---|---|---|---|---|
| 1 | Fine/Course Combination | ○ | ○ | ○ | ○ | ○ | ○ |
| 2 | Teeth 1 < 2 | ○ | ○ | ○ | ○ | — | ○ |
| 3 | 1: Ra < 0.05 | ○ | ○ | ○ | — | — | ○ |
| 4 | 2: Ra > 0.3 | — | — | — | — | — | ○ |
| 5 | Ry/Ra > 6 | ○ | ○ | ○ | ○ | ○ | ○ |
| 6 | Gear Shape | ○ | ○ | ○ | ○ | ○ | ○ |
| 7 | Rrms < 0.4 | ○ | ○ | ○ | ○ | ○ | ○ |
| 8 | Hv level | ○ | ○ | ○ | ○ | ○ | ○ |
| 9 | Hard Coating on 2 | — | — | ○ | — | — | — |
| 10 | DLC | — | — | ○ | — | — | — |
| 11 | H-free DLC | — | — | ○ | — | — | — |
| 12 | Barrel Polishing | ○ | ○ | ○ | ○ | ○ | ○ |

| | | | Example | | | | |
|---|---|---|---|---|---|---|---|
| | | | 7 | 8 | 9 | 10 | 11 |
| | | | | | Specification | | |
| | | | Smooth/ Normal | Hardness Low/High | One side DLC | One side H-containing DLC | Smooth (Grind)/ Smooth |
| Gear 1 | Number of Teeth | n | 15 | 15 | 15 | 15 | 15 |
| | Surface Roughness | Ra | 0.096 | 0.039 | 0.028 | 0.032 | 0.092 |
| | | Rq | 0.129 | 0.052 | 0.038 | 0.043 | 0.123 |
| | | Ry | 0.502 | 0.388 | 0.293 | 0.334 | 0.832 |
| | | Rsk | −1.2 | −0.6 | −1 | −1.2 | −0.5 |
| | | Ry/Ra | 5.2 | 9.9 | 10.5 | 10.4 | 9.0 |
| | Surface Hardness | HRC | 58 | 55 | 60 (800 HV) | 59 | 59 |
| | Finishing | | Barrel Polishing | Barrel Polishing | Barrel Polishing | Barrel Polishing | 2-Stage Grinding |
| | Surface Treatment | | | | | | |
| Gear 2 | Number of Teeth | n | 62 | 62 | 62 | 62 | 62 |
| | Surface Roughness | Ra | 0.312 | 0.168 | 0.120 | 0.153 | 0.205 |
| | | Rq | 0.390 | 0.210 | 0.150 | 0.191 | 0.256 |
| | | Ry | 3.35 | 1.725 | 1.35 | 1.482 | 2.343 |
| | | Rsk | −0.5 | −0.6 | −0.3 | −0.6 | −0.5 |
| | | Ry/Ra | 10.7 | 10.3 | 11.3 | 9.7 | 11.4 |
| | Surface Hardness | HRC | 60 | 62 | 60 (1553 HV) | 61 | 60 |
| | Finishing | | — | — | — | — | — |
| | Surface Treatment | | | | DLC by Arc Ion Plating | Plasma CVD | |
| Gear Pair | Composite Roughness | Rrms | 0.411 | 0.216 | 0.155 | 0.196 | 0.284 |
| Transmission Efficiency | % | | 95.1 | 96.5 | 98.3 | 97.7 | 95.2 |
| Pitting Fatigue Life | | | 1.92E+07 | 1.88E+07 | 1.90E+07 | 1.73E+07 | 1.23E+07 |
| Tooth Surface Temperature* | ° C. | | 132 | 125 | 120 | 127 | 128 |

| | Rrms approx. | Hardness HV Gear | DLC (HV 0.1) on Only | Specified Hydrogen | Not Barrel Polishing, Fine Particle |
|---|---|---|---|---|---|

TABLE 1-continued

| | | All helical gears | | | | |
|---|---|---|---|---|---|---|
| | | 0.4 | 1 < Gear 2 | Gear 2 | Content | Grinding |
| 1 | Fine/Course Combination | ○ | ○ | ○ | ○ | ○ |
| 2 | Teeth 1 < 2 | ○ | ○ | ○ | ○ | ○ |
| 3 | 1: Ra < 0.05 | ○ | ○ | ○ | ○ | — |
| 4 | 2: Ra > 0.3 | — | — | — | — | — |
| 5 | Ry/Ra > 6 | ○ | ○ | ○ | ○ | ○ |
| 6 | Gear Shape | ○ | ○ | ○ | ○ | ○ |
| 7 | Rrms < 0.4 | — | ○ | ○ | ○ | ○ |
| 8 | Hv level | ○ | ○ | ○ | ○ | ○ |
| 9 | Hard Coating on 2 | — | — | ○ | ○ | — |
| 10 | DLC | — | — | ○ | ○ | — |
| 11 | H-free DLC | — | — | ○ | — | — |
| 12 | Barrel Polishing | ○ | ○ | ○ | ○ | — |

*4TH on M/SFT, 442 Nm, oil temperature of 100° C., 4800 rpm @ shaft

TABLE 2

| | | | All helical gears | | | | | |
|---|---|---|---|---|---|---|---|---|
| | | | Comparative example | | | | | |
| | | | 1 | 2 | 3 | 4 | 5 | 6 |
| | | | Specification | | | | | |
| | | | Smooth/ Smooth | Smooth/ Smooth | DLC/ DLC | Normal/ Normal | Normal/ Normal | Normal/ Normal |
| Gear 1 | Number of Teeth | n | 15 | 15 | 15 | 15 | 15 | 15 |
| | Surface Roughness | Ra | 0.070 | 0.080 | 0.032 | 0.280 | 0.450 | 0.380 |
| | | Rq | 0.088 | 0.100 | 0.040 | 0.350 | 0.563 | 0.475 |
| | | Ry | 0.65 | 0.76 | 0.33 | 2.23 | 3.37 | 3.37 |
| | | Rsk | −0.8 | −1.2 | −2.1 | −0.7 | −0.5 | −0.5 |
| | | Ry/Ra | 9.3 | 9.5 | 10.3 | 8.0 | 7.5 | 8.9 |
| | Surface Hardness | HRC | 58 | 59 | 58 | 60 | 58 | 58 |
| | Finishing | | Barrel Polishing | Barrel Polishing | Barrel Polishing | — | — | — |
| | Surface Treatment | | | | DLC by Arc Ion Plating | | | |
| Gear 2 | Number of Teeth | n | 62 | 62 | 62 | 62 | 62 | 62 |
| | Surface Roughness | Ra | 0.020 | 0.030 | 0.020 | 0.430 | 0.300 | 0.380 |
| | | Rq | 0.025 | 0.038 | 0.025 | 0.538 | 0.375 | 0.475 |
| | | Ry | 0.26 | 0.33 | 0.24 | 1.83 | 3.11 | 4.22 |
| | | Rsk | −1.8 | −1.3 | −2.6 | −1.0 | −0.7 | 0.3 |
| | | Ry/Ra | 13.0 | 11.0 | 12.0 | 4.3 | 10.4 | 11.1 |
| | Surface Hardness | HRC | 58 | 60 | 59 | 58 | 59 | 59 |
| | Finishing | | Barrel Polishing | Barrel Polishing | Barrel Polishing | — | — | — |
| | Surface Treatment | | | | DLC by Arc Ion Plating | | | |
| Gear Pair | Composite Roughness | Rrms | 0.091 | 0.107 | 0.47 | 0.641 | 0.676 | 0.672 |
| Transmission Efficiency | % | | 96.5 | 95.9 | 98.8 | 94 | 94.6 | 94.6 |
| Pitting Fatigue Life | | | 3.44E+06 | 2.72E+06 | 2.80E+06 | 6.50E+06 | 4.94E+06 | 2.94E+06 |
| Tooth Surface Temperature* | ° C. | | 118 | 120 | 115 | 140 | 143 | 146 |

| | | | | | | | Large Rrms | Large Rrms | If positive Rsk, Short Life |
|---|---|---|---|---|---|---|---|---|---|
| 1 | Fine/Course Combination | | — | — | — | — | — | — | |
| 2 | Teeth 1 < 2 | | — | — | — | — | — | — | |
| 3 | 1: Ra < 0.05 | | — | — | — | — | — | — | |
| 4 | 2: Ra > 0.3 | | — | — | — | ○ | ○ | ○ | |
| 5 | Ry/Ra > 6 | | ○ | ○ | ○ | ○ | ○ | ○ | |
| 6 | Gear Shape | | ○ | ○ | ○ | ○ | ○ | ○ | |
| 7 | Rrms < 0.4 | | ○ | ○ | ○ | — | — | — | |

TABLE 2-continued

| | | All helical gears | | | | | |
|---|---|---|---|---|---|---|---|
| 8 | Hv level | — | ○ | ○ | — | ○ | ○ |
| 9 | Hard Coating on 2 | — | — | ○ | — | — | — |
| 10 | DLC | — | — | ○ | — | — | — |
| 11 | H-free DLC | — | — | ○ | — | — | — |
| 12 | Barrel Polishing | ○ | ○ | ○ | — | — | — |

*4TH on M/SFT, 442 Nm, oil temperature of 100° C., 4800 rpm @ shaft

The numbers 1 to 12 in the lower left of Table 1 and Table 2 represent the following configurations (1) to (12) respectively.
(1) The arithmetic average roughness Ra of the tooth surface of the first gear is less than 0.10, and the arithmetic average roughness Ra of the tooth surface of the second gear is equal to or greater than 0.15.
(2) The number of teeth of the first gear is less than the number of teeth of the second gear.
(3) The arithmetic average roughness Ra of the tooth surface of the first gear is equal to or less than 0.05.
(4) The arithmetic average roughness Ra of the tooth surface of the second gear is equal to or greater than 0.30.
(5) Both of the first and second gears have an Rsk of a negative value and a ratio of Ry to Ra (Ry/Ra) of 6 or more.
(6) Gear type
(7) The mean square roughness (composite roughness) Rrms of the first and second gears combined is Rrms<0.4.
(8) The surface hardness of the tooth surface of the first gear is less than the surface hardness of the tooth surface of the second gear.
(9) A hard surface treatment is provided at least on the surface of the second gear.
(10) The hard surface treatment is a DLC coating.
(11) The hydrogen content of the DLC coating is equal to or less than 1 at %.
(12) Barrel polishing is employed as the polishing method for smoothing the tooth surface of at least one of the gears.

As illustrated in Table 1, Example 1 and Example 2 had the configurations (1) to (3). Due to the low composite roughness Rrms, they exhibited high transmission efficiency and long pitting fatigue life.

Example 3 had the configuration (1) to (3) and (9) to (12). Due to the synergistic effect of the hydrogen-free DLC coating, it was one of samples that exhibited the highest transmission efficiency. Nevertheless, since the DLC coating with high abrasion resistance was formed on the tooth surface of the first gear, the pitting fatigue life was longer than that of Comparative example 4 having a standard specification although it was shorter than that of Example 1 and Example 2.

Example 4, which had the configurations (1) and (2), exhibited high transmission efficiency and long pitting fatigue life.

Example 5 was a sample in which the tooth surface of a gear having more teeth (the first gear in Example 5) was smoothed while the tooth surface of a gear having fewer teeth (the second gear in Example 5) was left course. It exhibited high transmission efficiency due to the low composite roughness Rrms. Nevertheless, the pitting fatigue life was longer than that of Comparative example 4 due to the poor conformability (running-in) of the gear having fewer teeth although it was shorter than that of Example 1 and Example 2.

Example 6 had the configuration (3) and (4), which remarkably improved the conformability (running-in). It exhibited high transmission efficiency while it also exhibited the longest pitting fatigue life among the examples.

Example 7 did not satisfy the requirement of the configuration (4) that the composite roughness Rrms of the first and second gears is 0.4 or less. Accordingly, it exhibited the lowest transmission efficiency in the examples, but it was higher than that of Comparative example 4.

Example 8 had the largest difference of the surface hardness between the first gear and the second gear, which improved the conformability (running-in). Accordingly, it exhibited relatively long pitting fatigue life.

Example 9 was a sample in which a hard surface treatment was provided to the tooth surface of a gear having more teeth as defined in the configuration (9) so that it had a hydrogen-free DLC coating of the configurations (10) and (11). It exhibited the highest transmission efficiency in the examples and also exhibited relatively long pitting fatigue life.

Example 10 did not satisfy the requirement of the configuration (10) since the surface treatment on the tooth surface of the second gear was a hydrogen-containing DLC coating formed by plasma CVD. It exhibited a transmission efficiency that is remarkably higher than that of Comparative example 4 but is lower than that of Example 9.

Example 11 was a sample in which processing with a grinding wheel for gears was employed as the smooth finishing of the first gear while barrel polishing was employed in the other examples. Accordingly, it exhibited a transmission efficiency that was lower than those of the other examples but was higher than that of Comparative example 4.

Compared to the above-described Examples, Comparative example 1 and Comparative example 2 listed in Table 2 were samples in which the first and second gears were both smoothed, and they did not have the configuration (1). Accordingly, they had very low composite roughness Rrms. Therefore, while they exhibited a very high transmission efficiency of about 96%, the pitting fatigue life was greatly decreased compared to Comparative example 4. As a result of observing the shape of the gears after the test, it was found that only slight abrasion occurred in the tooth surface which did not suffer from pitting. Accordingly, insufficient conformation (running-in) between the first gear and the second gear was considered to decrease the pitting fatigue life.

Comparative example 3 was a sample in which the first and second gears are both smoothed as with Comparative example 1 and Comparative example 2, and thereafter DLC coatings were formed. Accordingly, it did not have the configuration (1). As a result of the test, it exhibited the highest transmission efficiency due to the lowest composite roughness Rrms and the hydrogen-free DLC coatings formed on the first and second gears, but the pitting fatigue life was decreased to a great degree even compared to Comparative example 4.

Comparative example 4 and Comparative example 5 had the first and second gears both having high surface roughness and therefore had high composite roughness Rrms. Accordingly, it exhibited low transmission efficiency. Comparative example 6 had the second gear with a skewness Rsk of a positive value. A large amount of abrasion powder was produced during the test due to abrasion of protrusion tips of the surface roughness, which was considered to be a possible cause of the decrease of the pitting fatigue life.

As described above, gear pairs having the combinations of Example 1 to Example 11 were evaluated. In all of the gear pairs, an improvement of the transmission efficiency was achieved due to the improved composite roughness of a pair of gears, and both of an improvement of the transmission efficiency of the gears and an improvement of the pitting fatigue life of the tooth surfaces were achieved at low cost. Furthermore, as a result of measuring the temperature of the tooth surface, the gear pairs of the examples exhibited a temperature reducing effect that roughly corresponds to the transmission efficiency. This indirectly proves that the friction coefficient at a gear contact point was decreased.

The gear pair according to the present invention is not limited to the above-described embodiments, and the configuration can be suitably changed or combined without departing from the features of the present invention.

The invention claimed is:

1. A gear pair comprising a first gear and a second gear that are engaged and paired with each other, wherein an arithmetic average roughness Ra of a tooth surface of the first gear is less than 0.10 μm, and an arithmetic average roughness Ra of a tooth surface of the second gear is equal to or greater than 0.15 μm, and wherein a number of teeth of the first gear is less than a number of teeth of the second gear.

2. The gear pair according to claim 1, wherein the arithmetic average roughness Ra of the tooth surface of the first gear is equal to or less than 0.05 μm.

3. The gear pair according to claim 2, wherein the arithmetic average roughness Ra of the tooth surface of the second gear is equal to or greater than 0.30 μm.

4. The gear pair according to claim 1, wherein the arithmetic average roughness Ra of the tooth surface of the second gear is equal to or greater than 0.30 μm.

5. The gear pair according to claim 1, wherein surface roughness of tooth surfaces of the first gear and the second gear is such that both of the first gear and the second gear have an Rsk of a negative value and a ratio of Ry to Ra (Ry/Ra) of 6 or more, where Ra is the arithmetic average roughness of the surface roughness of the tooth surfaces of the first gear and the second gear, Ry is maximum height of the surface roughness of the tooth surfaces and Rsk is skewness.

6. The gear pair according to claim 1, wherein the first gear comprises at least one of a spur gear or a helical gear, and the second gear comprises at least one of a spur gear or a helical gear.

7. The gear pair according to claim 1, wherein root mean square heights Rq1 and Rq2 of tooth surfaces of the first gear and the second gear is such that a mean square roughness Rrms of Rq1 and Rq2 combined, which is defined as Rrms=$\sqrt{Rq1^2+Rq2^2}$), is Rrms<0.4.

8. The gear pair according to claim 1, wherein a surface hardness of the tooth surface of the first gear is less than a surface hardness of the tooth surface of the second gear.

9. The gear pair according to claim 8, wherein a hard surface treatment is provided on a surface of the second gear.

10. The gear pair according to claim 9, wherein the hard surface treatment is to form a diamond-like carbon coating.

11. The gear pair according to claim 10, wherein a hydrogen content of the diamond-like carbon coating is equal to or less than 1 at %.

12. The gear pair according to claim 1, wherein barrel polishing is employed as a polishing method for smoothing the tooth surface of at least one of the first gear and the second gear.

13. The gear pair according to claim 1, wherein a hard surface treatment is provided on a surface of at least the second gear among the first gear and the second gear.

14. The gear pair according to claim 1, wherein the arithmetic average roughness Ra of the tooth surface of the second gear is greater than 0.30 μm.

15. The gear pair according to claim 14, wherein the arithmetic average roughness Ra of the tooth surface of the first gear is equal to or less than 0.05 μm.

* * * * *